US010550826B2

(12) United States Patent
Sander et al.

(10) Patent No.: US 10,550,826 B2
(45) Date of Patent: Feb. 4, 2020

(54) EXTERNAL PLATFORM ASSEMBLY FOR WIND TURBINE REPAIRS (71) Applicant: General Electric Company, Schenectady, NY (US)

(72) Inventors: Michael Frederick Sander, Colonie, NY (US); Brian Thomas Misavage, Ballston Spa, NY (US); Gregory Clarence Thomas, Saratoga Springs, NY (US); Brian William Manikas, Schenectady, NY (US); Darrick Adam Vanderwalker, Pattersonville, NY (US); Kevin Tyler Eherts, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/654,778

(22) Filed: Jul. 20, 2017

(65) Prior Publication Data
US 2019/0024638 A1     Jan. 24, 2019

(51) Int. Cl.
*F03D 13/00* (2016.01)
*F03D 80/50* (2016.01)
(Continued)

(52) U.S. Cl.
CPC ............ *F03D 80/50* (2016.05); *B23P 6/002* (2013.01); *F03D 1/06* (2013.01); *F03D 13/20* (2016.05);
(Continued)

(58) Field of Classification Search
CPC .......... F03D 80/50; F03D 13/10; F03D 13/20; F05B 2230/80; F05B 2230/70; E04G 1/20; E04G 3/32
See application file for complete search history.

(56) References Cited

U.S. PATENT DOCUMENTS 7,740,107 B2 *  6/2010  Lemburg ................. E04G 3/30
                                                  182/142
8,453,797 B2 *  6/2013  Iversen ................... F03D 80/50
                                                  182/128
(Continued)

FOREIGN PATENT DOCUMENTS

DE   10 2005 025 646 A1   12/2006
EP        2 570 653 A1    3/2013
(Continued)

OTHER PUBLICATIONS

U.S. Appl. No. 15/498,760, filed Apr. 27, 2017.
(Continued)

*Primary Examiner* — Ninh H. Nguyen
(74) *Attorney, Agent, or Firm* — Dority & Manning, P.A.

(57) ABSTRACT

A disassembled wind turbine under repair includes a tower secured to a foundation and a nacelle mounted atop the tower. The nacelle includes a base wall, side walls, a front wall, a rear wall, and a top wall. The front wall includes an opening configured to receive a main shaft of the wind turbine; however, the main shaft and a rotor of the wind turbine have been removed from the nacelle during a repair procedure. As such, the disassembled wind turbine further includes an external platform assembly secured at the opening of the front wall of the nacelle during the repair procedure.

11 Claims, 11 Drawing Sheets (51) Int. Cl.
  *F03D 13/20* (2016.01)
  *F03D 80/80* (2016.01)
  *B23P 6/00* (2006.01)
  *F03D 1/06* (2006.01)

(52) U.S. Cl.
  CPC .......... *F03D 80/88* (2016.05); *F05B 2230/60* (2013.01); *F05B 2230/70* (2013.01); *F05B 2230/80* (2013.01)

(56) References Cited

U.S. PATENT DOCUMENTS

| | | | |
|---|---|---|---|
| 8,490,749 | B2 | 7/2013 | Teichert |
| 8,500,403 | B2 | 8/2013 | Grabau |
| 8,534,421 | B2 | 9/2013 | Teichert |
| 8,578,604 | B2 | 11/2013 | Malaschewski |
| 8,720,058 | B2 | 5/2014 | Anasis et al. |
| 8,991,047 | B2 | 3/2015 | Anasis et al. |
| 9,909,559 | B2 * | 3/2018 | Lohan .................... F03D 80/50 |
| 2002/0084142 | A1 | 7/2002 | Brennan et al. |
| 2011/0182750 | A1 | 7/2011 | Olesen et al. |
| 2014/0054110 | A1 * | 2/2014 | Fernandez Gomez ... E04G 3/30 182/19 |
| 2019/0040848 | A1 * | 2/2019 | Reynolds ................ F03D 80/50 |

FOREIGN PATENT DOCUMENTS

| | | |
|---|---|---|
| EP | 2 698 529 A1 | 2/2014 |
| EP | 3 067 553 A1 | 9/2016 |
| WO | WO2010/055278 A2 | 5/2010 |
| WO | WO2016/055068 A1 | 4/2016 |

OTHER PUBLICATIONS

U.S. Appl. No. 15/498,778, filed Apr. 27, 2017.
U.S. Appl. No. 15/498,790, filed Apr. 27, 2017.
U.S. Appl. No. 15/498,655, filed Apr. 27, 2017.
U.S. Appl. No. 15/498,682, filed Apr. 27, 2017.
U.S. Appl. No. 15/498,704, filed Apr. 27, 2017.
U.S. Appl. No. 15/498,805, filed Apr. 27, 2017.
Extended European Search Report and Opinion issued in connection with corresponding EP Application No. 18184176.8 dated Nov. 26, 2018.

* cited by examiner

EXTERNAL PLATFORM ASSEMBLY FOR WIND TURBINE REPAIRS

FIELD OF THE INVENTION

The present subject matter relates generally to wind turbines, and more particularly to an external platform for a wind turbine that provides a working surface for personnel during repair procedures.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate located within the nacelle. More specifically, in many wind turbines, the gearbox is mounted to the bedplate via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the rotor blades, which spin a low speed shaft, i.e. the main shaft. The main shaft is coupled to an input shaft of the gearbox, which has a higher speed output shaft connected to the generator. Thus, the geared drivetrain aims to increase the velocity of the mechanical motion. Further, the main shaft is typically externally supported by one or more bearings. In addition, the gearbox and the generator are mounted to the bedplate via one or more torque arms or supports.

Over time, the various wind turbine components may become worn and/or damaged due to loads and forces from the wind acting on the wind turbine. Unfortunately, repair of such components often requires the turbine machine head to be removed from atop the nacelle and transported to a manufacturing facility, which can be very time-consuming and labor intensive. Even still, if such repairs are made uptower, the nacelle has minimal space and/or working surfaces therein, thereby making it difficult for personnel to complete the needed tasks.

Accordingly, the present disclosure is directed to an external platform mountable to the front of the nacelle that provides a working surface for personnel during repair procedures.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for preparing a wind turbine for an uptower repair procedure. The method includes removing a rotor of the wind turbine. The method also includes removing a main shaft of the wind turbine so as to expose an opening in a front wall of a nacelle of the wind turbine. Further, the method includes securing an external platform assembly to the opening of the front wall of the nacelle to create a working surface for personnel during the repair procedure. It should be understood that the method may further include any of the additional steps and/or features as described herein.

In another aspect, the present disclosure is directed to a machine head assembly of a wind turbine mounted uptower. The machine head includes a nacelle and a bedplate secured within the nacelle. The nacelle includes a base wall, side walls, a front wall, a rear wall, and a top wall. The front wall includes an opening configured to receive a main shaft of the wind turbine; however, the main shaft and a rotor of the wind turbine have been removed from the nacelle during a repair procedure. As such, the machine head further includes an external platform assembly secured at the opening of the front wall of the nacelle during the repair procedure. It should be understood that the machine head may further include any of the additional features as described herein.

In yet another aspect, the present disclosure is directed to a platform assembly for an uptower repair procedure of a wind turbine. The platform assembly includes a working surface for personnel to stand on during the repair procedure, a platform frame mounted atop and at least partially surrounding the working surface, and an access assembly configured with the platform frame. The platform frame is adapted for securement within an opening of a front wall of a nacelle of the wind turbine during the repair procedure. The access assembly includes at least one access platform and one or more ladders so as to provide access to the working surface from within the nacelle. It should be understood that the platform assembly may further include any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
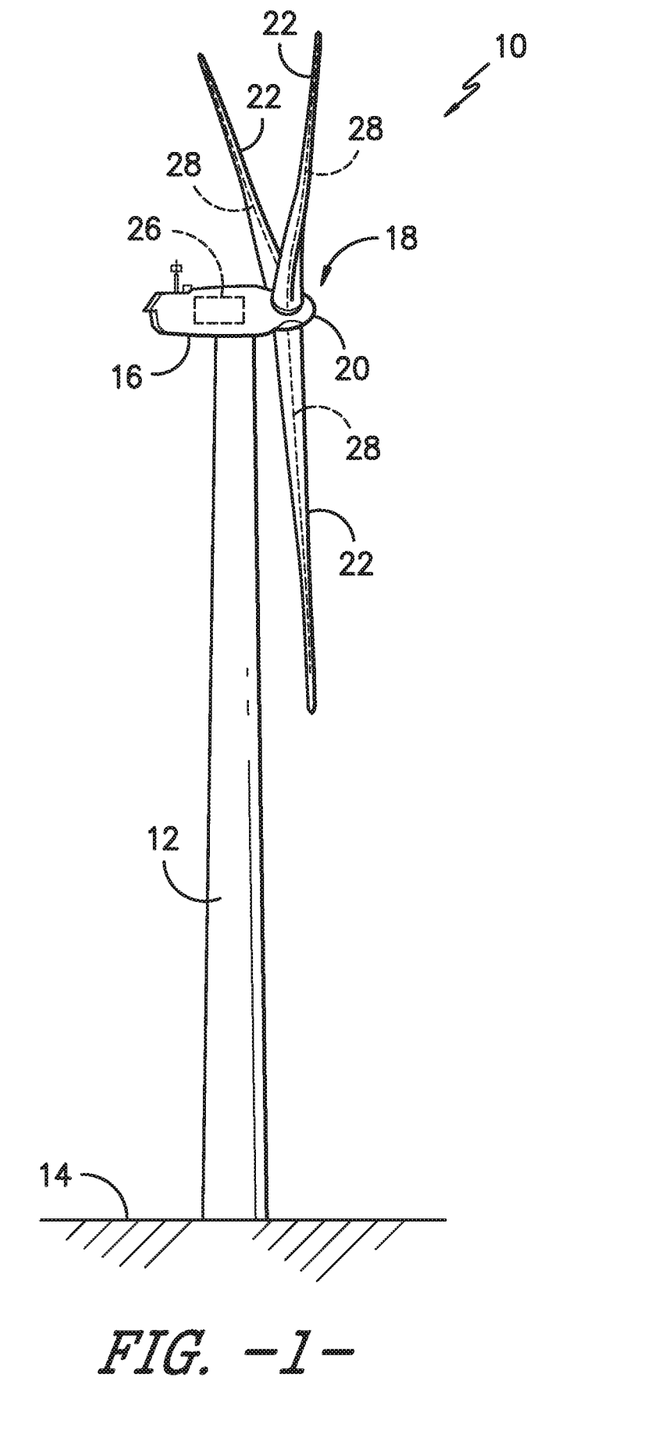
FIG. 1 illustrates a perspective view of one embodiment of a wind turbine according to the present disclosure.
Figure 2:
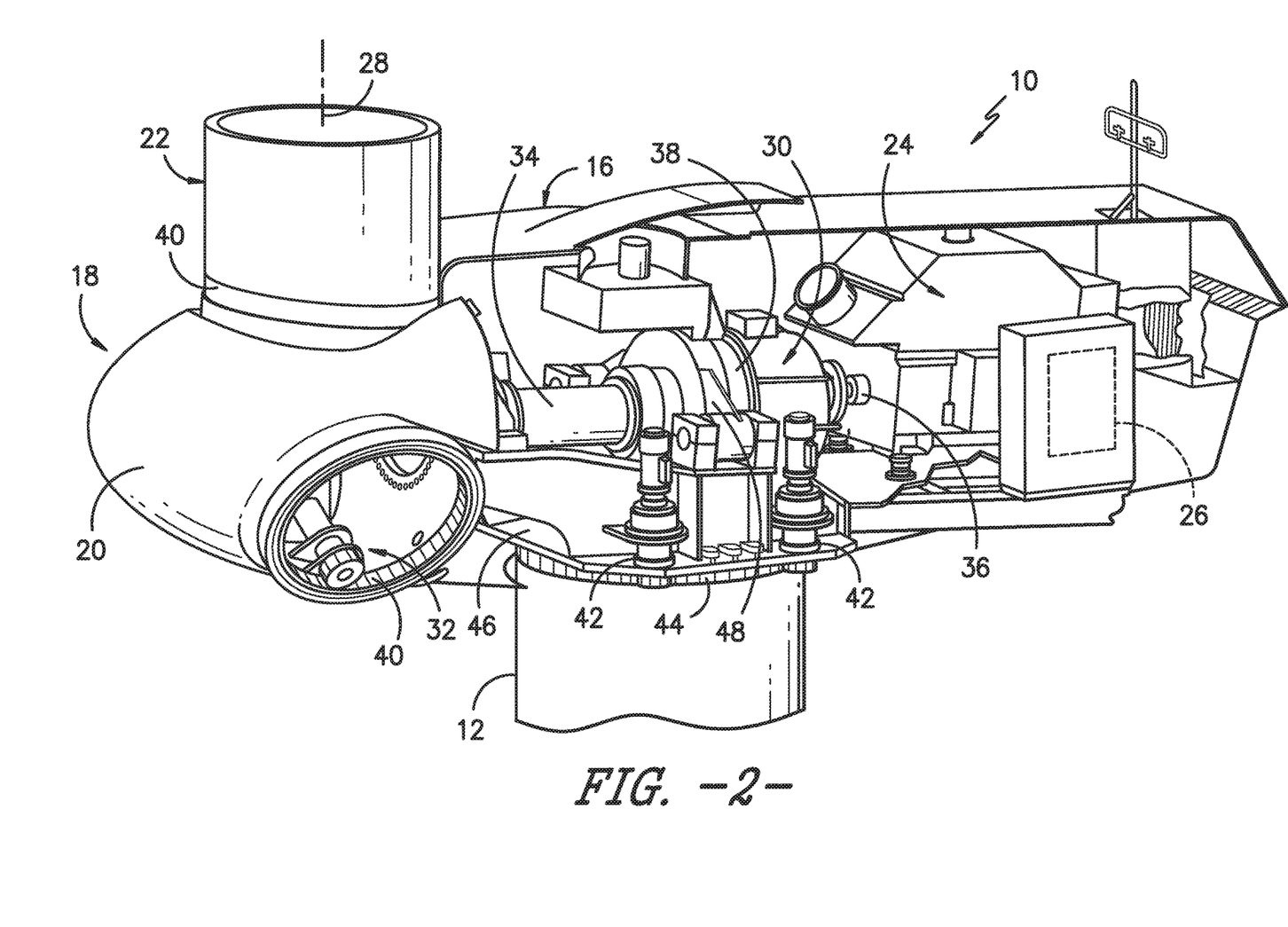
FIG. 2 illustrates a simplified, internal view of one embodiment of a nacelle of a wind turbine according to the present disclosure, particularly illustrating the nacelle during normal operation.
Figure 3:
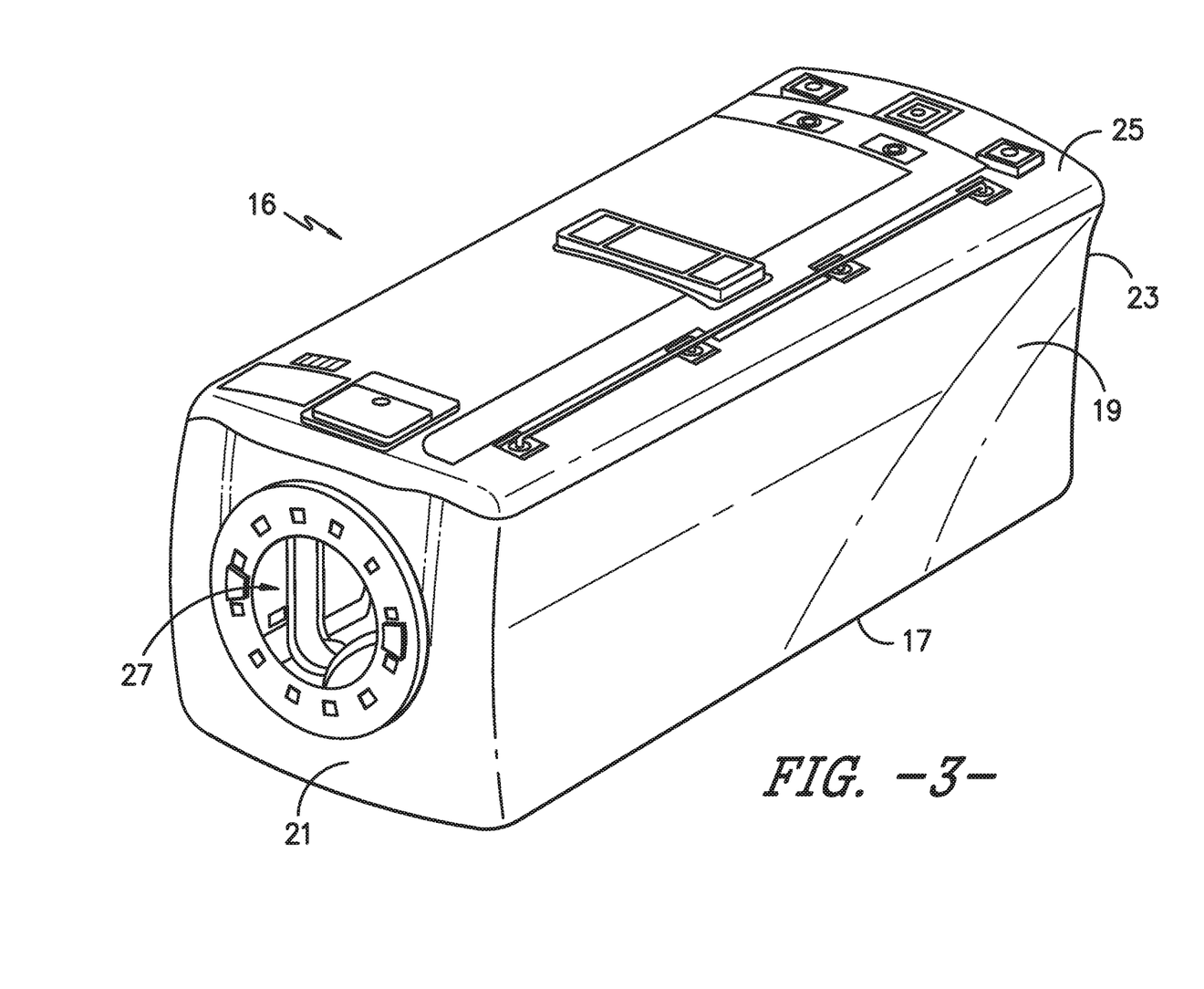
FIG. 3 illustrates a perspective view of one embodiment of a nacelle of a wind turbine according to the present disclosure.
Figure 4:
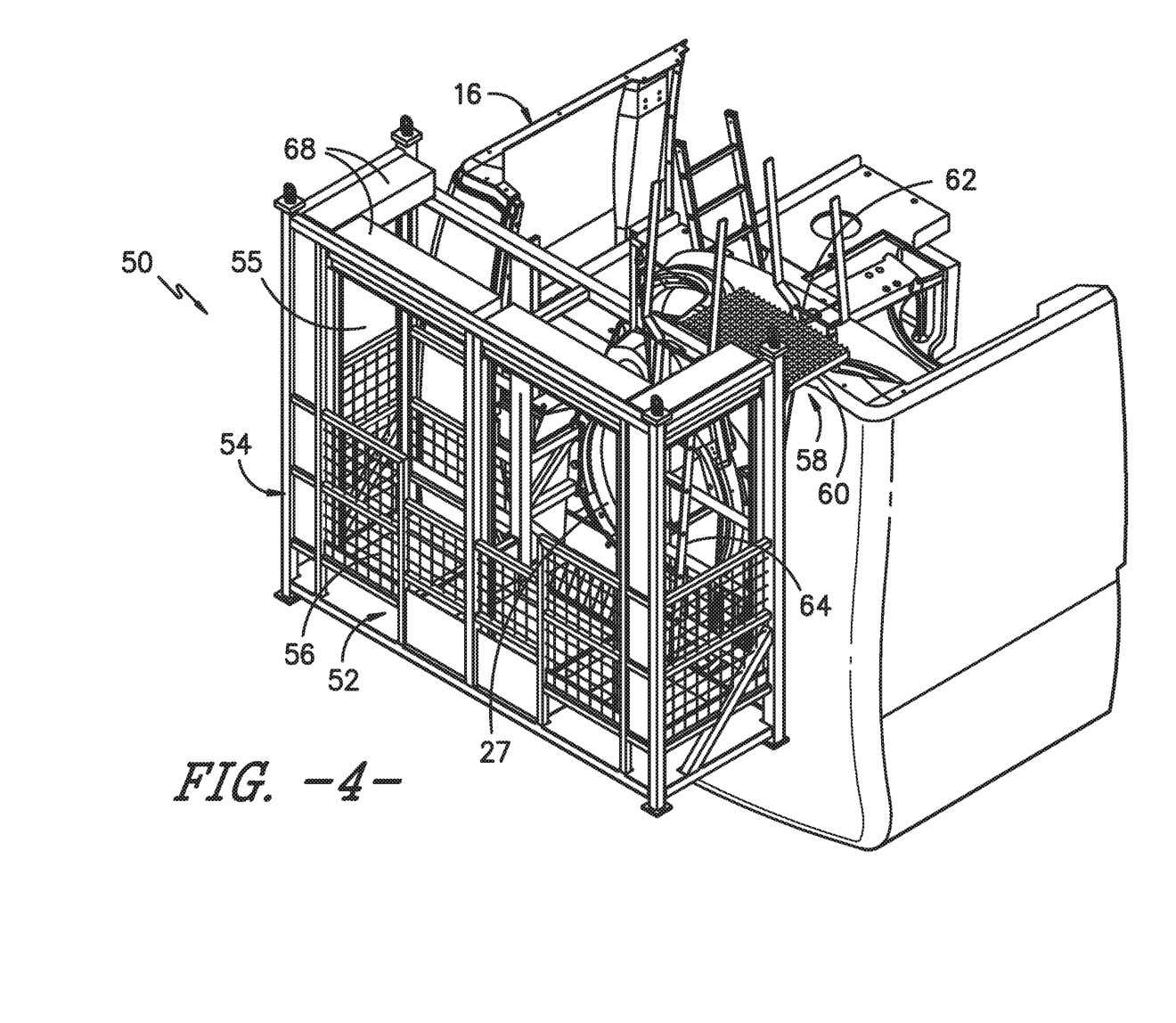
FIG. 4 illustrates an external perspective view of one embodiment of an external platform assembly mounted to an opening in a front wall of a nacelle of a wind turbine according to the present disclosure.
Figure 5:
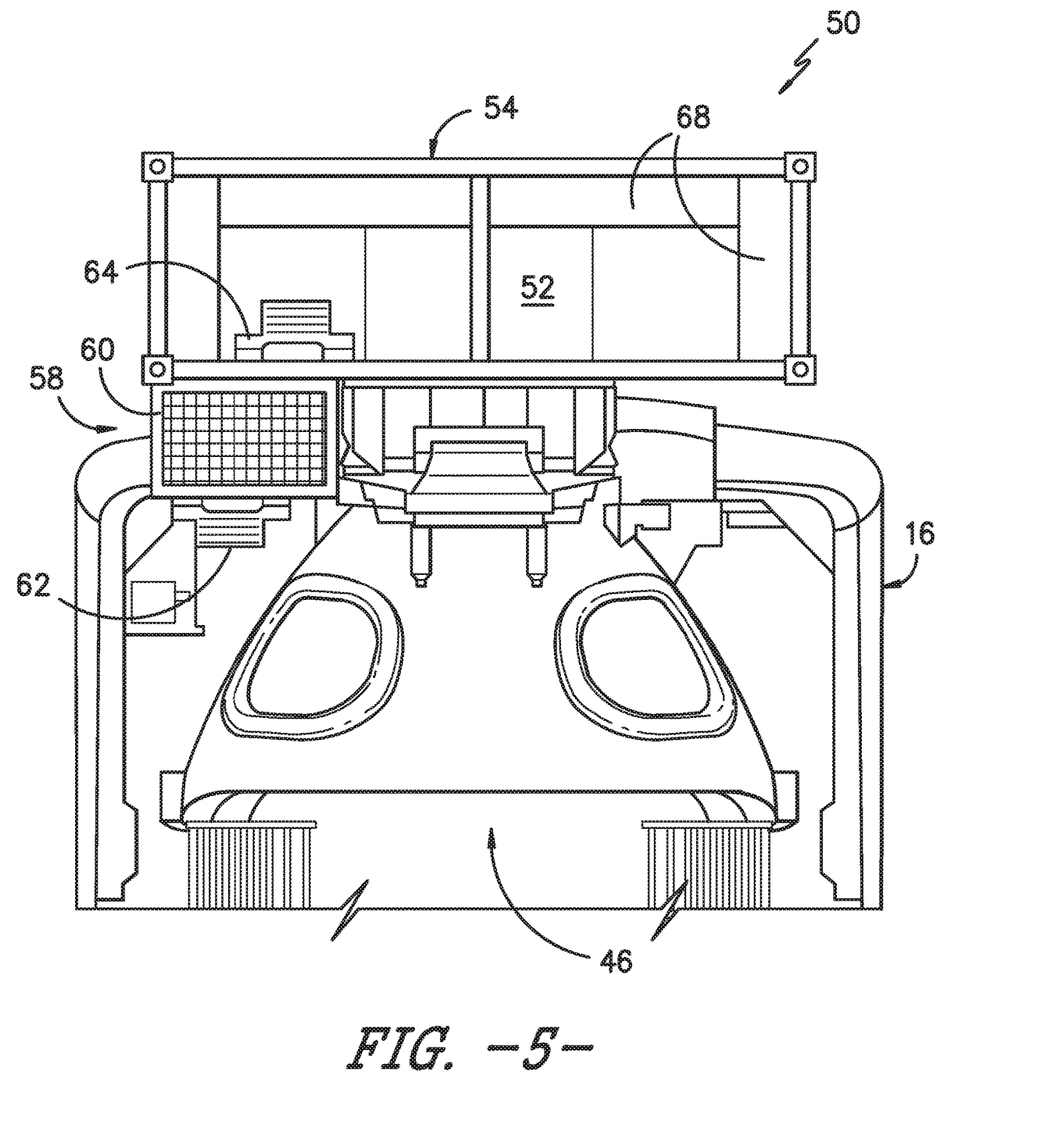
FIG. 5 illustrates a top view of one embodiment of an external platform assembly mounted to an opening in a front wall of a nacelle of a wind turbine according to the present disclosure.
Figure 6:
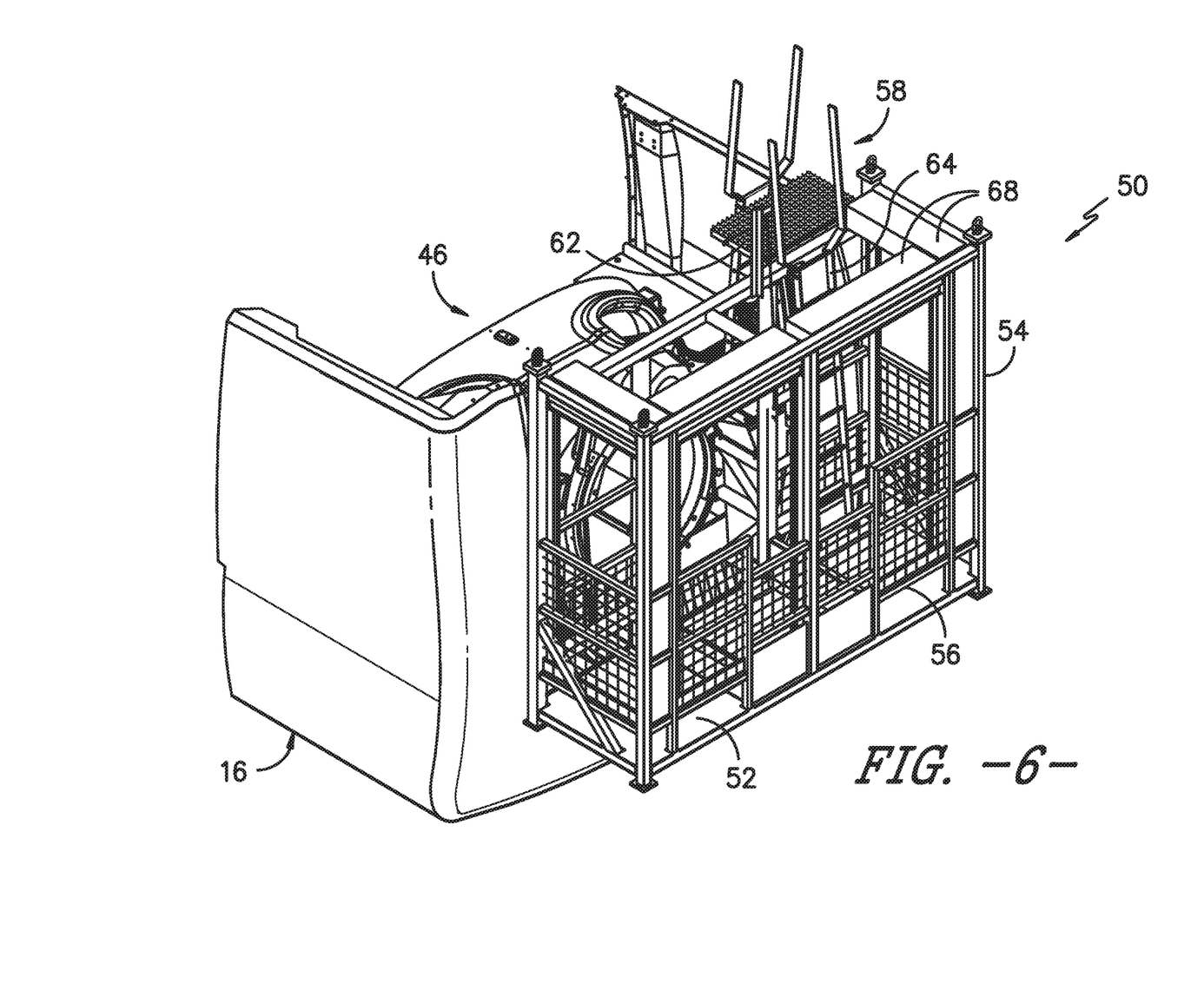
FIG. 6 illustrates another external perspective view of one embodiment of an external platform assembly mounted to an opening in a front wall of a nacelle of a wind turbine according to the present disclosure.
Figure 7:
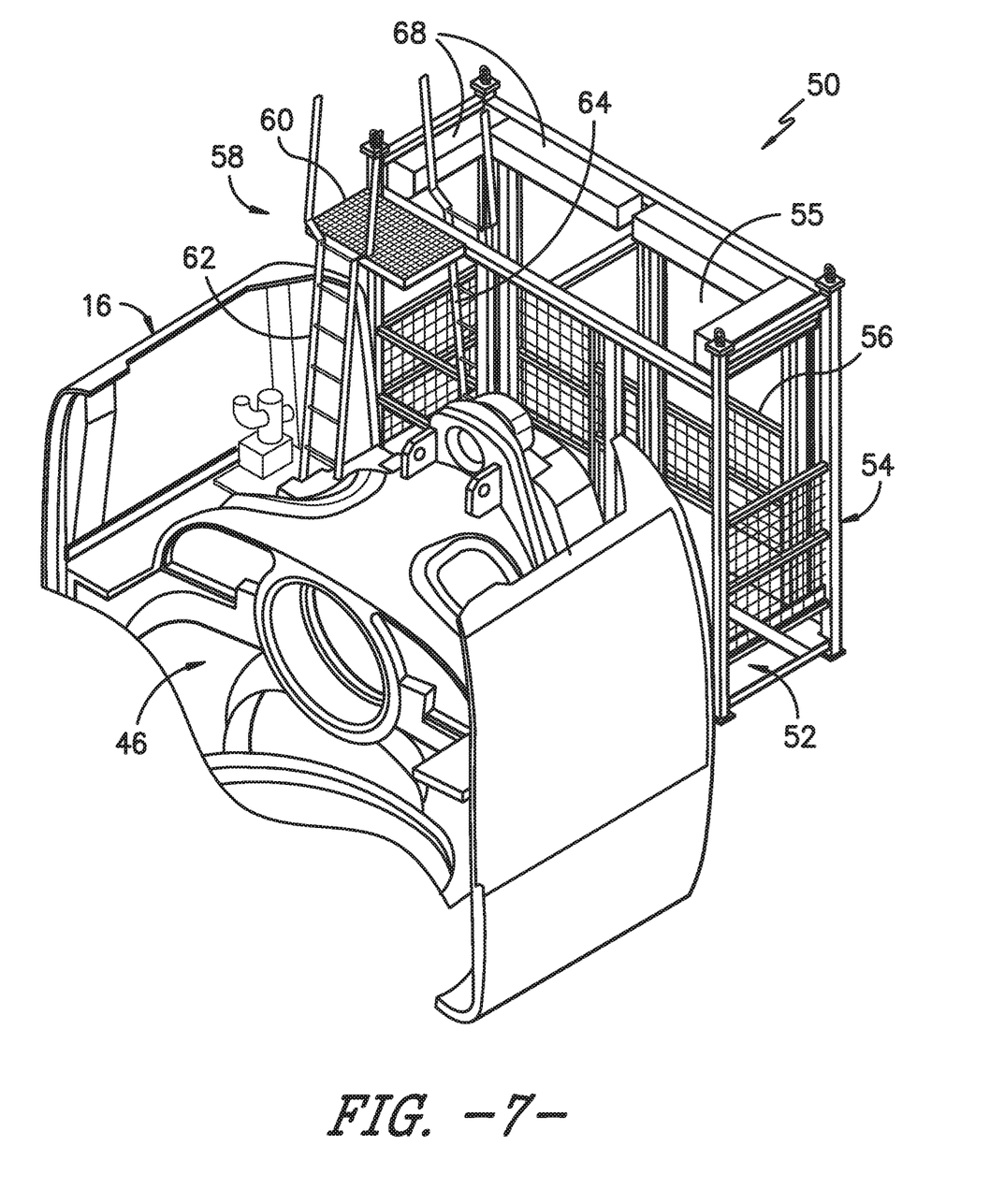
FIG. 7 illustrates an internal perspective view of one embodiment of an external platform assembly mounted to an opening in a front wall of a nacelle of a wind turbine according to the present disclosure.
Figure 8:
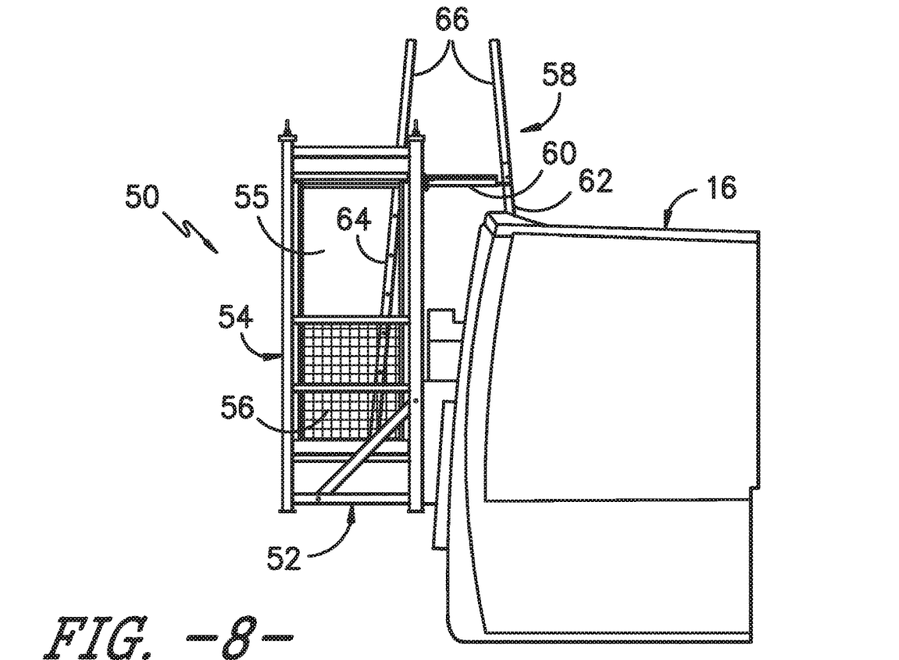
FIG. 8 illustrates a side view of one embodiment of an external platform assembly mounted to an opening in a front wall of a nacelle of a wind turbine according to the present disclosure.
Figure 9:
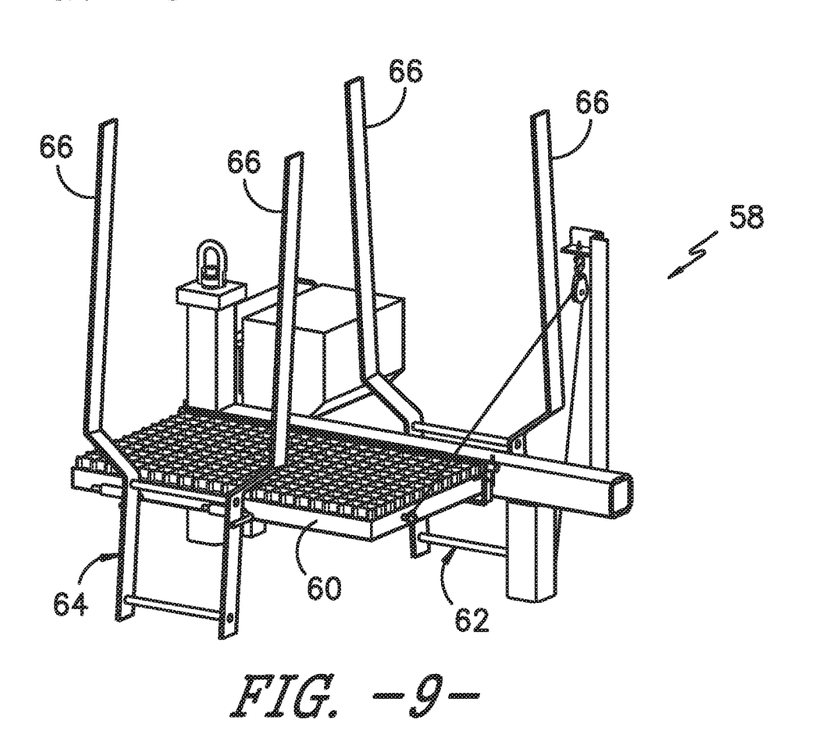
FIG. 9 illustrates a detailed perspective view of one embodiment of an access assembly mounted at a front wall of a nacelle of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. Thus, as shown in FIG. 3, the nacelle 16 corresponds to the overall housing structure and has a base wall 17, opposing side walls 19, a front wall 21, a rear wall 23, and a top wall 25 or lid. Further, as shown, the front wall 21 has an opening 27 configured to receive a main shaft 34 (FIG. 2) therethough that is connectable to the rotor 18.

As shown in FIG. 1, the rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Referring now to FIG. 2, a simplified, internal view of one embodiment of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

During operation of the wind turbine 10, various wind turbine components, such as those described herein, may become worn and/or damaged due to operating loads and forces from the wind acting on the wind turbine. Depending on the location of the damaged components, repair thereof can create hazardous conditions for personnel as access to the components uptower is difficult. In addition, the bedplate 46 is typically shaped and designed for the drivetrain components only and therefore does not provide a safe and even working surface. As such, the present disclosure is directed to an external platform assembly 50 that is mounted to an exterior surface of the nacelle 16 so as to provide a safe working space for repair procedures.

Referring generally to FIGS. 4-12, various views of one embodiment of the external platform assembly 50 of the present disclosure are illustrated. More specifically, the figures generally illustrate the external platform assembly 50 secured to a disassembled wind turbine 10 under repair, i.e. the nacelle 16 is still uptower, however, the rotor 18 and the main shaft 34 have been removed so as to expose the opening 27 in the front wall 21. Thus, as shown, the external platform assembly 50 is secured at the opening 27, e.g. to the bedplate 46 of the wind turbine 10. Further, as shown, the external platform assembly 50 may include a working surface 52 and a platform frame 54 mounted to and at least partially surrounding the working surface 52. Further, as shown generally in the figures, the platform frame 54 may include any suitable beam structure having any number of columns, beams, girders, spandrels, and/or trusses connected to one another and to the columns so as to surround the working surface 52. As such, the platform frame 54 protects personnel working from the working surface 52 from falling. In addition, as shown particularly in FIGS. 4 and 6-8, the platform frame 54 may also include a guard rail 55 or handrail so as to further protect personal working from the working surface 52.

Referring particularly to FIGS. 4-9, the external platform assembly 50 may also include an access assembly 58 for providing access from within the nacelle 16 to the platform assembly 50. More specifically, as shown particularly in FIG. 9, the access assembly 58 may include an access platform 60 mounted to or otherwise secured atop the front wall 21 of the nacelle 16. In such embodiments, the external platform assembly 50 may also include a first ladder 62 arranged within the nacelle 16 and a second ladder 64 arranged outside of the nacelle 16 (e.g. within the platform assembly 50). Thus, as shown, the access platform 60 may be positioned between the first and second ladders 62, 64. In further embodiments, as shown particularly in FIGS. 8 and 9, the first and second ladders 62, 64 may each include hand rails 66 extending from top edges of parallel legs thereof. As such, personnel can easily and safely climb from within the nacelle 16 up the first ladder 62, stepping onto and over the front wall 21 via the access platform 60, and into the platform assembly 50 via the second ladder 64, all while holding onto the hand rails 66.

Figure 10:
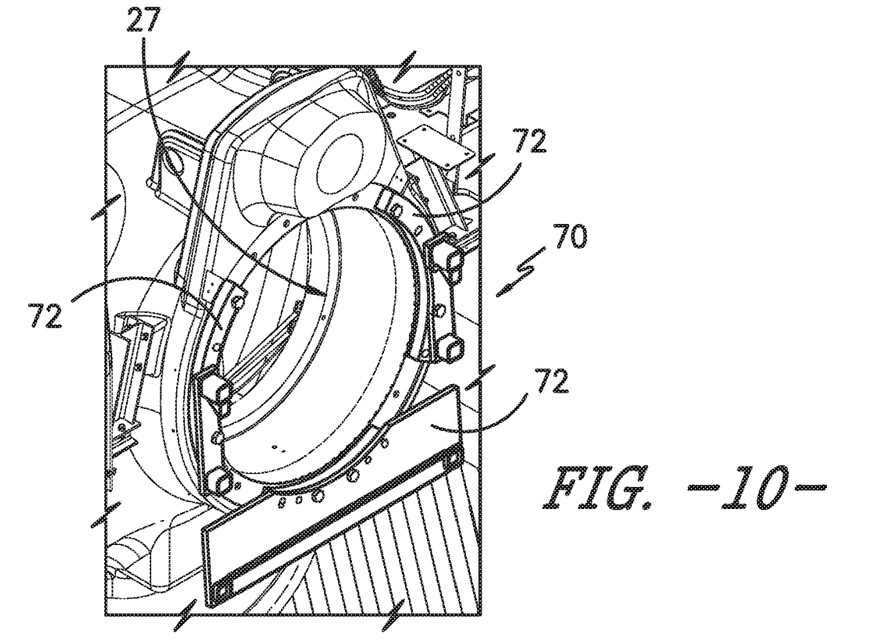
FIG. 10 illustrates a detailed perspective view of one embodiment of mounting plates of a mounting assembly mounted at an opening of a front wall of a nacelle of a wind turbine according to the present disclosure.
Figure 11:
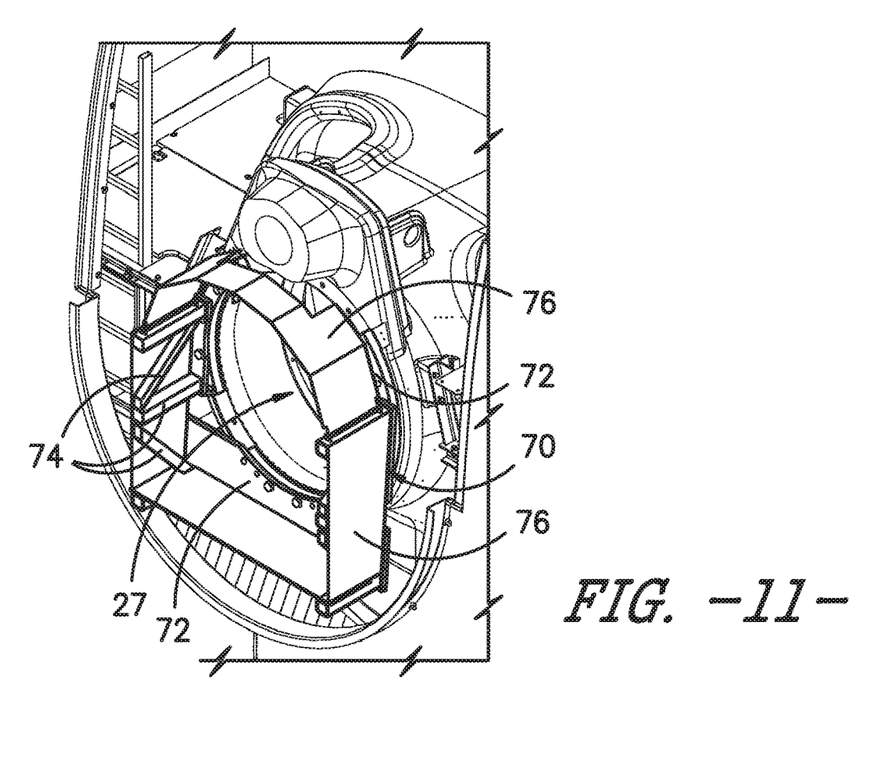
FIG. 11 illustrates a detailed perspective view of one embodiment of a mounting assembly mounted at an opening of a front wall of a nacelle of a wind turbine according to the present disclosure.
Figure 12:
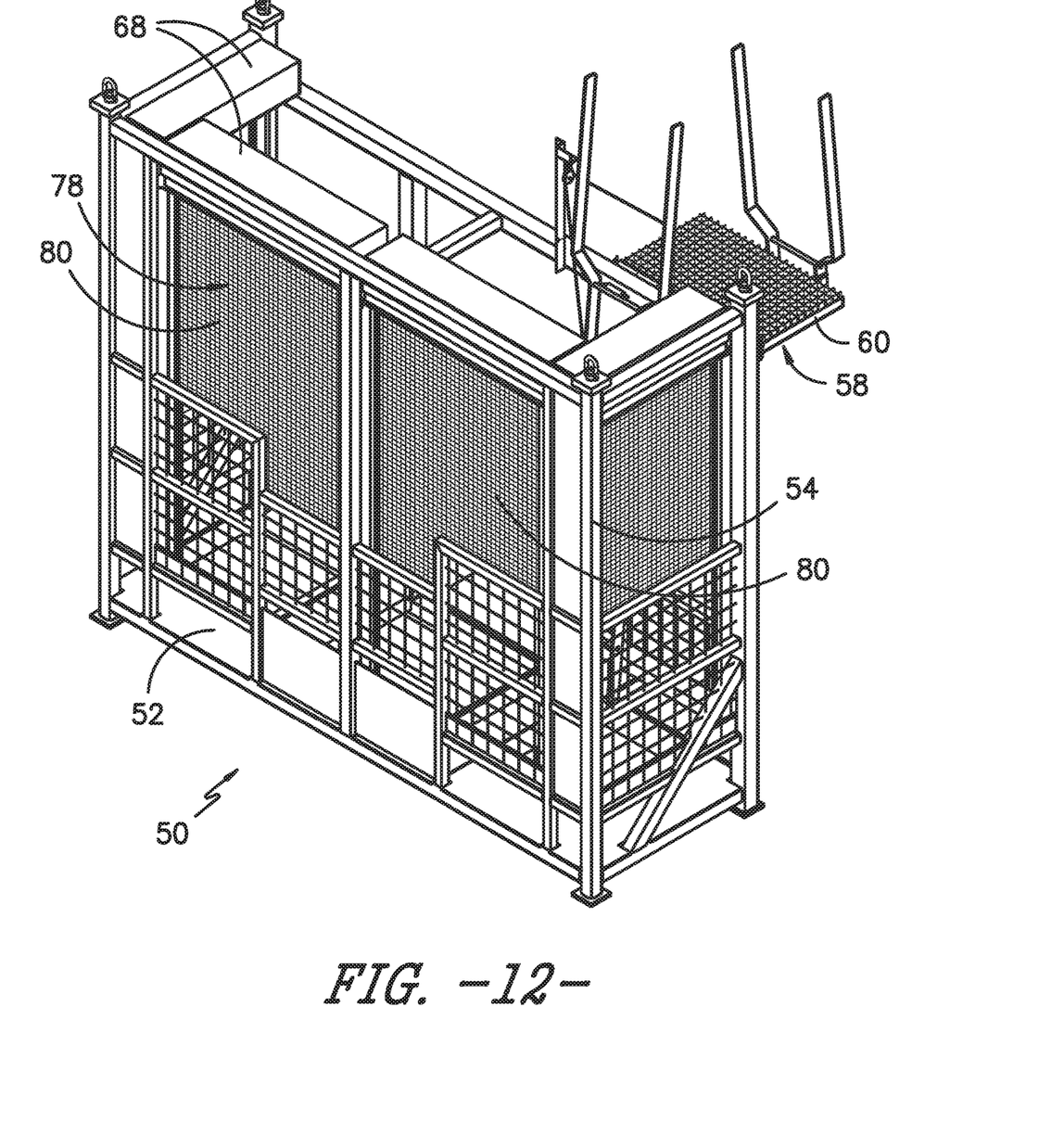
FIG. 12 illustrates a perspective view of one embodiment of an external platform assembly mounted to an opening in a front wall of a nacelle of a wind turbine according to the present disclosure, particularly illustrating a cover assembly of the platform assembly covering openings thereof.

Referring particularly to FIGS. 10 and 11, the external platform assembly 50 may further include a mounting assembly 70 for securing the platform frame 54 to the opening 27 of the front wall 21 of the nacelle 16. For example, as shown, the mounting assembly 70 may include one or more mounting plates 72, a plurality of fasteners (not shown), a plurality of structural beams 74, one or more heat sheets 76, and/or combinations thereof. More specifically, as shown in FIG. 10, a lower mounting plate 72 is mounted below the opening 27 and two side mounting plates 72 are mounted around the opening 27. Thus, the mounting plates 72 provide the mounting location for the platform assembly 50. Further, as shown in FIG. 11, the platform assembly 50 may be secured to the mounting plates 72 via the structural beams 74. Moreover, as shown, a plurality of heat sheets 76 may be mounted around the structural beams 74 so as to provide protection to personnel.

Referring now to FIGS. 4-7 and 12, the external platform assembly 50 may also include an adjustable cover assembly 78 for providing cover to at least a portion of one or more openings 55 of the platform frame 54. For example, as shown, the cover assembly 78 may include a plurality of mountable beams 68 for securing a plurality of cover panels 80 or shades to the platform frame 54, with each of the cover panels 80 designed to fit a different opening 55 in the platform frame 64. As such, the cover panels 80 can be adjusted (e.g. opened and closed) by personnel. Thus, the cover assembly 78 is configured to provide additional safety to personnel working from the platform assembly 50. For example, in one embodiment, the cover assembly 78 provides fall protection, as well as protection from hazardous weather conditions (e.g. rain, wind, snow, sleet, ice, hail, cold temperatures, hot temperatures, etc.).

It should also be understood that the external platform assembly 50 described herein may be constructed of any suitable material and may have any desired shape. For example, in certain embodiments, the external platform assembly 50 may be constructed of a material configured to support any suitable weight. More specifically in one embodiment, the external platform assembly 50 may support a weight of at least 500 lbs/ft$^2$. Such materials may include but are not limited to aluminum, wood, steel, a composite material, and/or combinations thereof. Alternatively, the external platform assembly 50 may support a weight of less than 500 lbs/ft$^2$.

Figure 13:
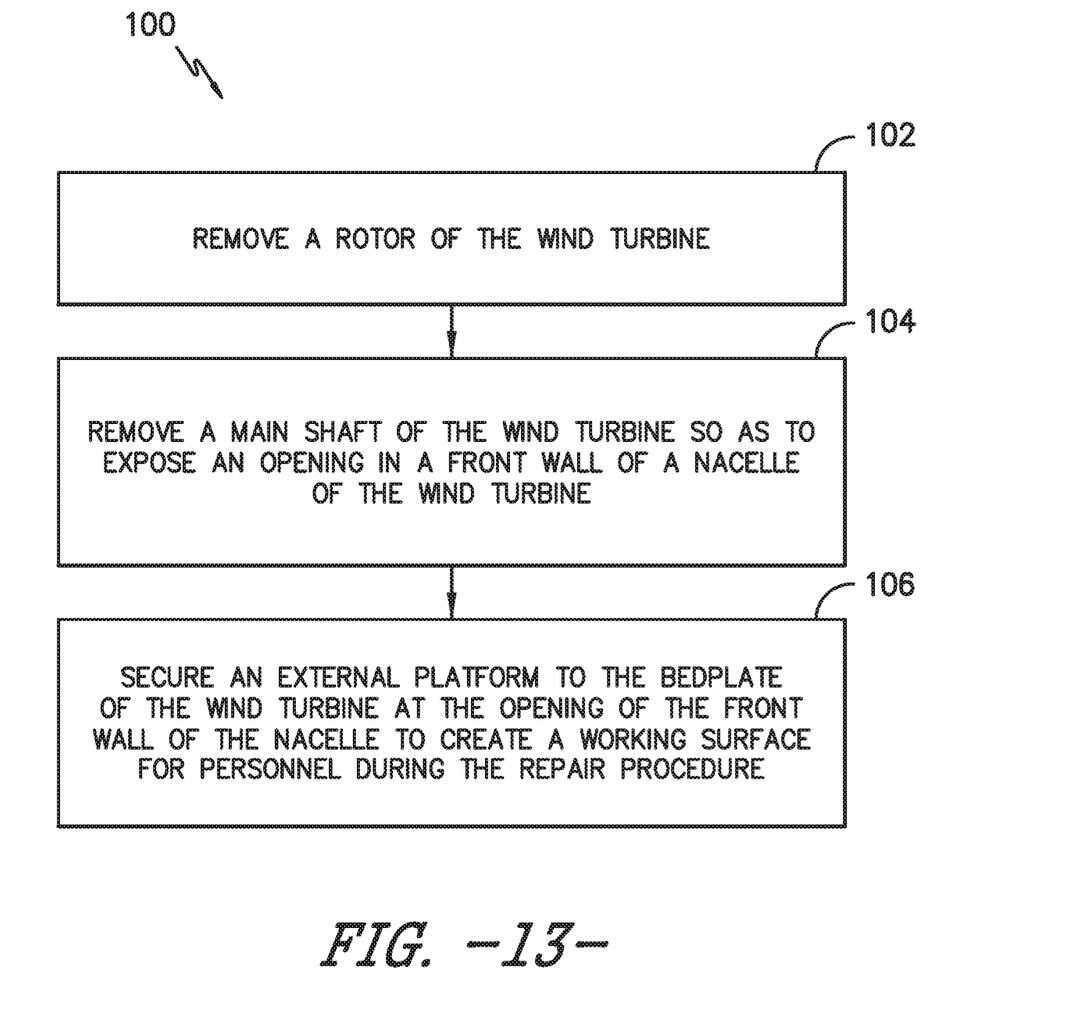
FIG. 13 illustrates a flow diagram of one embodiment of a method for preparing a wind turbine for an uptower repair procedure according to the present disclosure.

Referring now to FIG. 13, a flow diagram of one embodiment of a method 100 for preparing a wind turbine, such as the wind turbine 10 of FIG. 1, for an uptower repair procedure is illustrated. As shown at 102, the method 100 includes removing the rotor 18 of the wind turbine 10. As shown at 104, the method 100 includes removing the main shaft 34 of the wind turbine 10 so as to expose the opening 27 in the front wall 21 of the nacelle 16 of the wind turbine 10. As shown at 106, the method 100 includes securing the external platform assembly 50 to the opening 27 of the front wall 21 of the nacelle 16 to create a working surface for personnel during the repair procedure.

In one embodiment, the external platform assembly 50 may be secured at the opening 27 of the front wall 21 of the nacelle 16 by mounting a plurality of mounting plates 72 to an exterior surface of the front wall 21 of the nacelle 16 and/or the bedplate 46, mounting a plurality of structural beams 74 to the mounting plates 72, and mounting the external platform assembly 50 to the structural beams 74.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A machine head assembly of a wind turbine mounted uptower, comprising:
    a nacelle comprising a base wall, side walls, a front wall, a rear wall, and a top wall, the front wall comprising an opening configured to receive a main shaft of the wind turbine, the main shaft and a rotor of the wind turbine being removed from the nacelle during a repair procedure;
    a bedplate secured within the nacelle; and,
    an external platform assembly secured to bedplate at the opening of the front wall of the nacelle during the repair procedure.

2. The machine head assembly of claim 1, wherein the external platform assembly comprises a working surface and a platform frame, the platform frame mounted to and at least partially surrounding the working surface.

3. The machine head assembly of claim 2, wherein the external platform assembly further comprises an access platform mounted to the front wall of the nacelle.

4. The machine head assembly of claim 3, wherein the external platform assembly further comprises a first ladder arranged within the nacelle and a second ladder arranged outside of the nacelle, the access platform positioned between the first and second ladders.

5. The machine head assembly of claim 4, wherein the first and second ladders each comprises hand rails extending from top edges of parallel legs thereof.

6. The machine head assembly of claim 5, wherein the platform frame further comprises a guard rail.

7. The machine head assembly of claim 2, wherein the external platform assembly further comprises a cover assembly for providing cover to at least a portion of one or more openings of the platform frame.

8. The machine head assembly of claim 1, wherein the external platform assembly further comprises a mounting assembly for securing the platform frame to the opening of the front wall of the nacelle.

9. The machine head assembly of claim 8, wherein the mounting assembly comprises at least one of one or more mounting plates, a plurality of fasteners, a plurality of structural beams, or one or more heat sheets.

10. The machine head assembly of claim 1, wherein the external platform assembly is constructed of a material configured to support a weight of at least 500 pounds per square feet.

11. The machine head assembly of claim 10, wherein the material comprises at least one of aluminum, wood, steel, a composite material, or combinations thereof.

* * * * *